USOO5638251A

United States Patent [19]
Goel et al.

[11] Patent Number: 5,638,251
[45] Date of Patent: Jun. 10, 1997

[54] CAPACITIVE THIN FILMS USING DIAMOND-LIKE NANOCOMPOSITE MATERIALS

[75] Inventors: Arvind Goel, Buffalo; Donald J. Bray, East Amherst; Steven C. Martin, Williamsville; Keith A. Blakely, Buffalo, all of N.Y.

[73] Assignee: Advanced Refractory Technologies, Inc., Buffalo, N.Y.

[21] Appl. No.: 538,475

[22] Filed: Oct. 3, 1995

[51] Int. Cl.$^6$ .................................................. H01G 4/06
[52] U.S. Cl. ........................ 361/313; 361/311; 361/318; 361/319; 361/321.3; 427/530; 427/537; 427/249; 427/122; 29/25.42
[58] Field of Search ................................ 361/313, 311, 361/321.3, 306.3, 321.4, 317, 318, 319, 312, 287; 427/528, 531, 530, 527, 79, 249, 577, 573, 574, 580

[56] References Cited

U.S. PATENT DOCUMENTS

| | | |
|---|---|---|
| 4,191,735 | 3/1980 | Nelson et al. . |
| 4,783,368 | 11/1988 | Yamamoto et al. . |
| 4,816,291 | 3/1989 | Desphandey et al. . |
| 4,822,466 | 4/1989 | Rabalais et al. . |
| 4,842,937 | 6/1989 | Meyer et al. . |
| 4,877,677 | 10/1989 | Hirochi et al. . |
| 4,897,829 | 1/1990 | Ikoma et al. . |
| 4,915,977 | 4/1990 | Okamoto et al. . |
| 4,933,058 | 6/1990 | Bache et al. . |
| 4,948,388 | 8/1990 | Ringwood . |
| 4,960,643 | 10/1990 | Lemelson . |
| 4,961,958 | 10/1990 | Desphandey et al. . |
| 4,980,021 | 12/1990 | Kitamura et al. . |
| 4,985,051 | 1/1991 | Ringwood . |
| 4,992,298 | 2/1991 | Deutchman et al. . |
| 5,002,899 | 3/1991 | Geis et al. . |
| 5,032,243 | 7/1991 | Bache et al. . |
| 5,040,501 | 8/1991 | Lemelson . |
| 5,055,318 | 10/1991 | Deutchman et al. . |
| 5,064,801 | 11/1991 | Juntgen et al. . |
| 5,068,148 | 11/1991 | Nakahara et al. . |
| 5,077,103 | 12/1991 | Wagner et al. . |
| 5,087,434 | 2/1992 | Frenklach et al. . |
| 5,094,915 | 3/1992 | Subramaniam . |
| 5,100,424 | 3/1992 | Jang et al. . |

(List continued on next page.)

FOREIGN PATENT DOCUMENTS 2 158 086  3/1985  United Kingdom .

OTHER PUBLICATIONS

Dorfman, "Diamond–Like Nanocomposites (DLN)", Thin Solid Films, 267–273:212 (1992).
R. d'Agostino, ed., "Plasma Deposition, Treatment and Etching of Polymers", Academic Press, San Diego, 1990.
Dorfman, V.F., et al., Sov. Phys. Dokl., 28 (1983) 743 (English Abstract).
Dorfman, V., "Synthesis of Solid State Structure", Metallurgia, Moscow (1986).
Dorfman, V., et al. Diamond Films '90, Proc. 1st European Conf. on Diamond and Diamond–Like Carbon Coatings, Crans–Montana (1990).
Weissmantel et al. J. Vac. Sci. Technol. vol. A4, 2892.
Dorfman, et al. J. Tech. Phys. Lett., 14:1033 (1988).
Ageev, "Light Induced Variations of Optical Properties of Diamond–Like Films", Surface and Coating Technologies, 47:269–278 (1991).

*Primary Examiner*—Leo P. Picard
*Assistant Examiner*—Anthony Dinkins
*Attorney, Agent, or Firm*—Nixon, Hargrave, Devans & Doyle LLP

[57] ABSTRACT

A method of making capacitors comprising, providing as the dielectric and/or conductive layers, a material made from a diamond-like nanocomposite solid-state material having interpenetrating atomic scale networks of carbon in a diamond-like carbon network stabilized by hydrogen, a glass-like silicon network stabilized by oxygen, and optionally at least one additional network of dopant elements or dopant compounds having elements from Groups 1–7b and 8 of the periodic table.

27 Claims, 5 Drawing Sheets

U.S. PATENT DOCUMENTS

| | | |
|---|---|---|
| 5,101,288 | 3/1992 | Ohta et al. . |
| 5,110,577 | 5/1992 | Tamor et al. . |
| 5,135,808 | 8/1992 | Kimock et al. . |
| 5,137,784 | 8/1992 | Suzuki et al. . |
| 5,142,390 | 8/1992 | Ohta et al. . |
| 5,142,785 | 9/1992 | Grewal et al. . |
| 5,158,828 | 10/1992 | Sudani et al. . |
| 5,169,579 | 12/1992 | Marcus et al. . |
| 5,171,732 | 12/1992 | Hed . |
| 5,174,983 | 12/1992 | Snail . |
| 5,177,299 | 1/1993 | Kondo et al. . |
| 5,183,602 | 2/1993 | Raj et al. . |
| 5,190,807 | 3/1993 | Kimock et al. . |
| 5,198,285 | 3/1993 | Arai et al. . |
| 5,202,571 | 4/1993 | Hirabayashi et al. . |
| 5,206,083 | 4/1993 | Raj et al. . |
| 5,210,430 | 5/1993 | Taniguchi et al. . |
| 5,219,769 | 6/1993 | Yonehara et al. . |
| 5,232,568 | 8/1993 | Parent et al. . |
| 5,243,199 | 9/1993 | Shiomi et al. . |
| 5,249,554 | 10/1993 | Tamor et al. . |
| 5,256,483 | 10/1993 | Yamazaki et al. . |
| 5,295,305 | 3/1994 | Hahn et al. . |
| 5,352,493 | 10/1994 | Dorfman et al. ............ 427/530 |
| 5,466,431 | 11/1995 | Dorfman et al. . |

CAPACITIVE THIN FILMS USING DIAMOND-LIKE NANOCOMPOSITE MATERIALS

FIELD OF THE INVENTION

The present invention relates to the manufacture of capacitors, especially to the use of diamond-like nanocomposite materials as dielectric and conductive layers in capacitors and other capacitive thin films.

BACKGROUND OF THE INVENTION

Present efforts in the field of electronics continues to place a premium on component size. Component miniaturization affords consumers with heightened levels of convenience. As a result, electronics manufacturers continue to seek ways to make electronics components smaller, leading to the production of more compact appliances, stereo equipment, medical implanted devices, etc. In addition, the requirements of military and space devices include smaller size, higher energy density, and reduced overall weight.

However, there are many factors limiting how small a component can be. For example, the technology of making capacitors used in components is limited by the availability of dielectric materials which can reliably hold and deliver a required charge, and withstand a required voltage while being extremely thin. Presently, an assortment of crystalline dielectric materials are incorporated into capacitors. Presently available crystalline compounds used as dielectrics in capacitors include, barium titanate, tantalum oxide, and an assortment of various polymeric and liquid crystal mixtures.

Capacitors are devices that store electrical energy. They typically consist of a dielectric material sandwiched between electrically conductive materials. A wide variety of capacitor configurations is possible. The performance parameters of a capacitor depend on the electrical characteristics of the materials selected, including the characteristics of the dielectric material. Such characteristics include dielectric constant, breakdown strength, resistivity, loss on dissipation factor, inductance, etc. Capacitor performance also depends upon the physical, mechanical, thermal and other properties of the materials used to make the capacitor.

Specialty electronics often require specially designed capacitors. In instances where electronics miniaturization is essential, there is a need to reduce the volume of the capacitor, and a need to increase the capacitor's energy density. For example, capacitors are used in the power supply of cardiac defibrillators. A defibrillator is an implanted medical device that continuously monitors the performance of the patient's heart. When a "fibrillation", or heartbeat irregularity is detected, the device delivers a high voltage pulse to the heart via a lead connecting the defibrillator to the heart. This high voltage pulse usually restores the heart's normal rhythmic function. For a defibrillator to properly function, a special type of capacitor having a high energy density is required.

However, the size of the capacitor remains a problem. Current defibrillator capacitors are one of the larger components of a defibrillator. As a result, the defibrillator usually must be implanted in the patient's abdomen—a less desirable location as compared to implantation in the chest. Implantation in the chest cavity would require shorter electrical leads thereby reducing cost and patient discomfort. To achieve the significant miniaturization desired to reduce the overall size of the defibrillator capacitor, the capacitor's energy density must be substantially increased. Presently known materials have not made such miniaturization possible.

High energy density potential and overall component weight reduction may be important, even when miniaturization is not an issue for a particular application. Electric vehicles, for example, must incorporate capacitors capable of high energy density to provide bursts of power for acceleration or climbing, while desirably having reduced weight.

For a capacitor to work effectively, the dielectric layer must not transfer the stored charge prematurely. Therefore the dielectric layer must have low leakage current or high resistivity. In addition, the layer must not undergo dielectric breakdown in the presence of operating voltages. High voltage holdoff is difficult to accomplish if the dielectric material is made too thin. Voltage holdoff is understood to refer to the amount of voltage a material may "hold off" before breakdown occurs. On the other hand, a thick dielectric layer may also display poor (low) breakdown strength due to a greater tendency for imperfections in the dielectric layer as the layer thickness increases.

Many diamond-like coatings (DLCs) have been tried as dielectric materials in capacitors, but have failed for a variety of inherent structural reasons. One critical property of a successful dielectric capacitor material is superior long term adherence. Known DLCs do not possess satisfactory adherence on their own. Most known DLCs exhibit high intrinsic stress and inadequate adhesion. They also suffer from the presence of graphitic domains which lower resistivity, increasing leakage current. DLCs have low thermal stability, and rapidly graphitize at relatively low temperatures. Upon graphitization, the DLCs becomes conductive, thereby frustrating the purpose for the dielectric coating as a capacitor, rendering it useless. Such an event would be catastrophic for a capacitor sealed in an electrical implanted medical device, such as a fibrillator.

The lack of an adequately coated and insulated electrical component often results in the failure or shorter lifetime of the device served by the component. Further, radiation effects, including ultraviolet radiation and ion-bombardment often accelerate DLC deterioration through erosion or graphitization of the DLC coating.

A strong, highly adherent, dielectric material which could be electrically "tuned" to increase its usefulness and flexibility as a capacitor, while also being deposited in ultra-thin layers and exhibiting outstanding high breakdown strength and high energy density would be desirable.

SUMMARY OF THE INVENTION

One feature of the present invention relates to the use of diamond-like nanocomposite materials deposited as a thin dielectric layer in a capacitor.

A further embodiment of the present invention relates to a method of increasing the energy density of a capacitor by applying to a conductive material, a layer of dielectric material made from a diamond-like nanocomposite solid state material having interpenetrating atomic scale networks comprising a first diamond-like carbon network stabilized by hydrogen, a second glass-like silicon network stabilized by oxygen, and optionally at least one network of dopant elements or dopant compounds containing elements from Groups 1 to 7b and 8 of the periodic table.

A still further embodiment of the present invention relates to a method of making a capacitor comprising providing multiple conductive layers with a dielectric layer placed between adjacent layers. The dielectric layers are made from a diamond-like nanocomposite solid state material having interpenetrating atomic scale networks comprising a first diamond-like carbon network stabilized by hydrogen, a second glass-like silicon network stabilized by oxygen, and optionally at least one network of dopant elements or dopant compounds containing elements from Groups 1 to 7b and 8 of the periodic table.

Another embodiment of the present invention relates to a method of selectively modifying the conductivity of a dielectric layer in a capacitor by providing as the dielectric layer, a tunable coating made from a diamond-like nanocomposite solid state material having interpenetrating atomic scale networks comprising a first diamond-like carbon network stabilized by hydrogen, a second glass-like silicon network stabilized by oxygen, and optionally at least one network of dopant elements or dopant compounds having elements from Groups 1 to 7b and 8 of the periodic table.

In still another embodiment, the present invention relates to a tunable dielectric coating in a capacitor formed from a diamond-like solid-state material comprising an interpenetrating diamond-like carbon network stabilized by hydrogen, a glass-like silicon network stabilized by oxygen, and optionally at least one network of dopant elements or dopant compounds having elements from Groups 1–7b and 8 of the periodic table.

In a still further embodiment, the present invention relates to a capacitor comprising more than one conductive layer and a dielectric layer placed between adjacent conductive layers, said dielectric layer formed from a diamond-like nanocomposite solid state material formed from interpenetrating networks, said networks comprising a first diamond-like carbon network stabilized by hydrogen, a second silicon network stabilized by oxygen and, optionally, at least one network of dopant elements, or compounds having elements from Groups 1–7b and 8 of the periodic table.

In another embodiment, the invention relates to a method of controlling the charge-holding capacity of a substrate surface. A substrate surface is provided and coated with at least one dielectric layer made from a diamond-like nanocomposite solid state material having interpenetrating networks comprising a diamond-like carbon network stabilized by hydrogen, a glass-like silicon network stabilized by oxygen, and optionally at least one network of non-conductive dopant elements or non-conductive dopant compounds containing elements from Groups 1 to 7b and 8 of the periodic table.

In still another embodiment the present invention relates to a component capable of holding a charge at its surface. The component comprises at least one layer of dielectric material made from a diamond-like solid-state material formed from interpenetrating networks comprising a diamond-like carbon network stabilized by hydrogen, a glass-like silicon network stabilized by oxygen and, optionally, at least one network of dopant elements or dopant compounds having elements from Groups 1–7b and 8 of the periodic table. Conductive layers may optionally be incorporated into the charge-holding component, and such conductive layers may also be made from the diamond-like solid state material. In this case, the third network containing the dopants in included.

DETAILED DESCRIPTION OF THE INVENTION

The present invention relates to a method of making, and increasing the energy density, of a capacitor by applying to at least one layer of conductive material, at least one layer of dielectric material made from a diamond-like nanocomposite material having interpenetrating atomic scale networks comprising a first diamond-like carbon network stabilized by hydrogen, a second glass-like silicon network stabilized by oxygen, and optionally at least one network of non-conductive dopant elements or non-conductive dopant compounds containing elements from Groups 1 to 7b and 8 of the periodic table.

The capacitance of a parallel pilate capacitor is given by the formula:

$$C=kA/t$$

where C is capacitance in electrostatic units (esu), k is the dielectric constant of the dielectric material, A is the material's area, and t is the material thickness. The thickness of a dielectric layer in a capacitor is determined by the selected operating voltage and the breakdown strength of the selected dielectric. Capacitance directly affects the amount of energy to be stored. The energy is represented by the formula:

$$E=CV^2$$

where C is capacitance (esu), E is energy, and V is voltage. Further, capacitor volume is inversely proportional to the capacitance. A material with a high breakdown strength can be used in smaller thicknesses for a given operating voltage, thereby increasing the capacitance and energy stored. In addition, since energy density is inversely proportional to capacitor volume, and capacitor volume directly depends on dielectric thickness, a dielectric material having high breakdown strength can be greatly reduced in volume while increasing the energy density of the capacitor. Further, as thickness is reduced, capacitance increases. Therefore, for a given required capacitance, a smaller area is required. The two factors, reduced thickness and reduced area, combine to increase the achievable energy density for a given material.

The DLNs of the present invention, having high breakdown strength, display properties conducive to their use as superior dielectric materials in capacitors. The dielectric constant of the contemplated DLNs can be varied by modifying deposition conditions and composition (by doping). For undoped films, the varying deposition conditions can achieve a range of dielectric constant of from about 3 to about 10, with values outside this range possible. For doped films where a third network is established in the DLN matrix, a much larger range of dielectric constant values can be achieved—up to and above 60. The DLN films become increasingly conductive as the concentration of doping increases. It is to be understood that the level of conductance established in the DLN layer will match the desired application, where a certain amount of current leakage, for example, may be desirable.

The ideal capacitor material would be one capable of a high energy density and also a high breakdown strength.

This combination of properties would allow for an extremely thin capacitor. Breakdown strengths of known dielectric materials used in capacitors are in the $10^6$ V/cm range. By contrast, the DLN films of the present invention display breakdown voltage values as high as $5 \times 10^6$ V/cm. The high values are attributed to the layers which can be effectively deposited and factors including the layer uniformity, lack of graphitic carbon or other crystallinity, low intrinsic stress, high stability, and the unique atomic structure of the DLN films.

It is understood, that by varying the concentration of dopants as the DLN is deposited, a continuum of DLN layers may be established such that the DLN material itself could function as a stand alone capacitor. In this way, undoped DLN layers act as dielectrics, and the alternating doped-DLN layers are "conductive" to varying, preselected degrees. The use of DLN films as capacitors may not necessarily be in the form of "stand-alone" charge carrying devices. Capacitive DLN films can be an integral part of another system. Applications exist, for example, in the printing or copying machine industry where dielectric films are used as "leaky" capacitors (allowing small currents to flow through) to impart certain electrical characteristics to the surface of a device or component.

Figure 5:
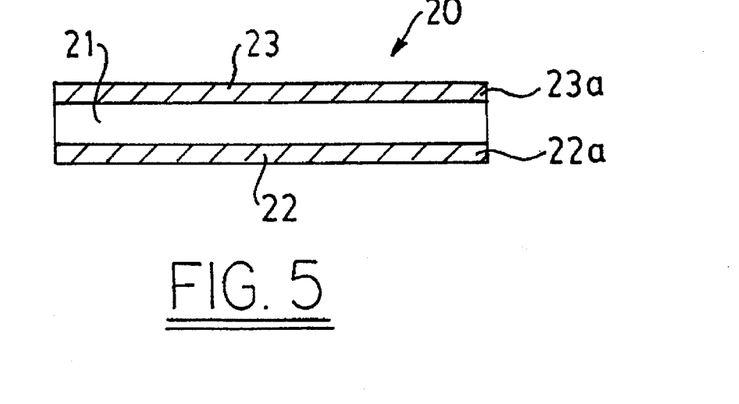
FIGS. 5–7 show schematic drawings of capacitor designs of single and multiple conductive and dielectric layers.
Figure 6:
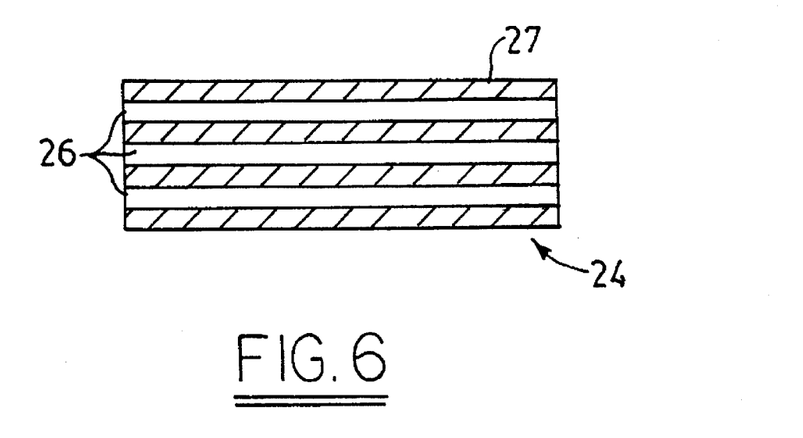
Figure 7:
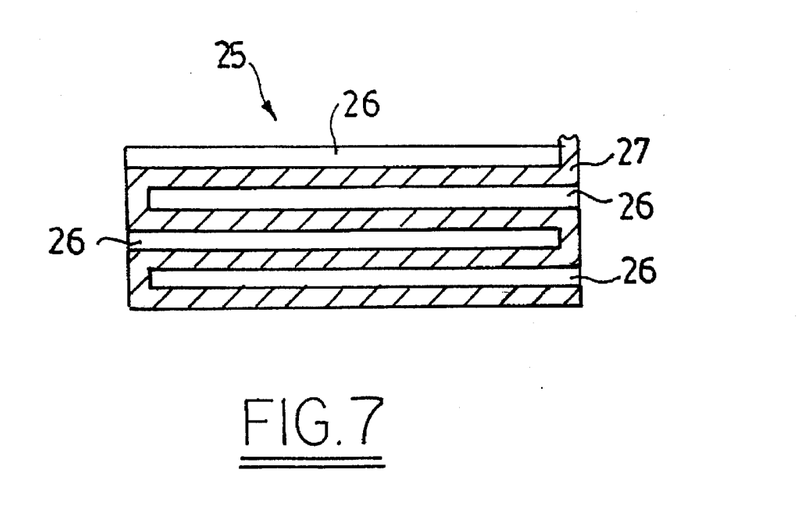

A capacitor may be fabricated from the DLN films in a variety of ways. As shown in FIG. 5, the simplest arrangement is a single layer of dielectric DLN film 21 deposited on a conducting substrate layer 22 (first electrode with lead 22a), on top of which is deposited a second conducting substrate layer 23 (second electrode with lead 23a). The DLN film thickness ranges from about 0.01 to about 50 micrometers, and is more preferably from about 0.1 to about 2.0 micrometers. FIGS. 6 and 7 show more complex configurations including multilayer capacitors 24, 25 where layers of the DLN dielectric material 27 alternate with conducting layers 26 which may include metals, ceramics, polymers, or even conductive doped-DLN layers. Capacitor structures can be built up in multilayered structure comprising tens or hundreds of thin alternating layers, and have overall thicknesses ranging from about 1 to about 20 micrometers. Each layer has a thickness of from about 10 to about 100 nanometers. A further possibility is to coat a very thin polymer sheet (e.g. a 1.5 micron solvent cast polycarbonate film) with a dielectric DLN film, where the polymer serves primarily as a carrier for the high breakdown strength DLN film, while providing a free standing dielectric material that can be alternately metallized.

The fundamental structure of the preferred tunable dielectric coatings of the present invention are atomic scale diamond-like nanocomposites (DLNs). The DLNs are comprised of two or more self-stabilized random networks. Each network is itself stabilized chemically, while both networks also structurally stabilize each other. An example of a material with such a structure is the diamond-like nanocomposite (DLN) which is the subject of U.S. Pat. No. 5,352,493 and U.S. Ser. No. 08/249,167 filed May 24, 1994. In the DLN, a first random "diamond-like" carbon network, is chemically stabilized by hydrogen atoms. A second glass-like silicon network is chemically stabilized by oxygen atoms, resulting in a purely amorphous structure. The tunability of the coating may be achieved by varying the content and concentration of the optional additional networks made from dopant elements or dopant compounds. The tunability desired is also achieved by closely controlling the deposition conditions of the coatings.

"Amorphous" as used herein refers to a random structure or arrangement of atoms in a solid state that results in no long range regular ordering, and no crystallinity or granularity. Such DLNs contain no clusters or ordering greater than about 10 Angstroms. This absence of clusters at the atomic scale is a key characteristic of the DLN coatings of the present invention. Clusters can destroy the amorphous nature of the structure, and can serve as active centers of degradation. The DLN structure has been confirmed via electron projection methods, scanning tunneling microscopy, atomic force microscopy, glancing x-ray and electron diffraction techniques and high resolution transmission electron microscopy (TEM). Cluster formation is prevented in the sources, in the primary plasma, in the chamber space, and during film growth.

Figure 1A:
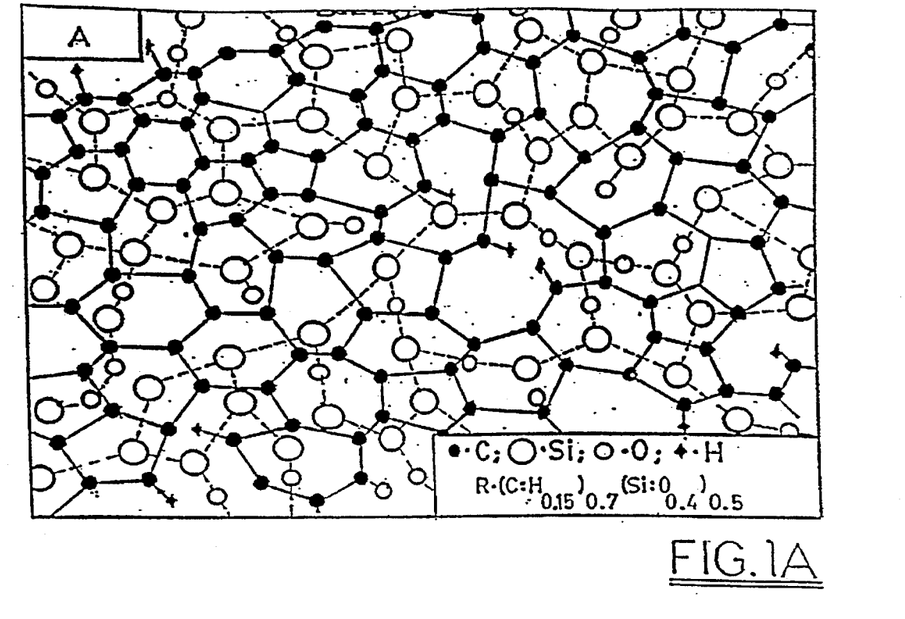
FIG. 1 is a schematic diagram showing the principle microstructure of two-network (A), intermediate (B), and three-network (C) nanocomposites.
Figure 1B:
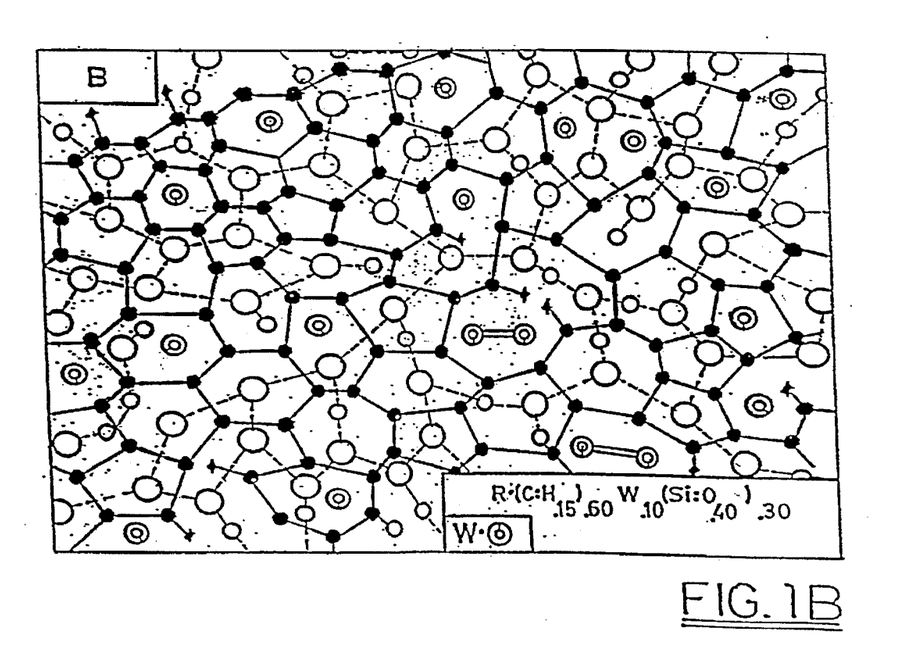
Figure 1C:
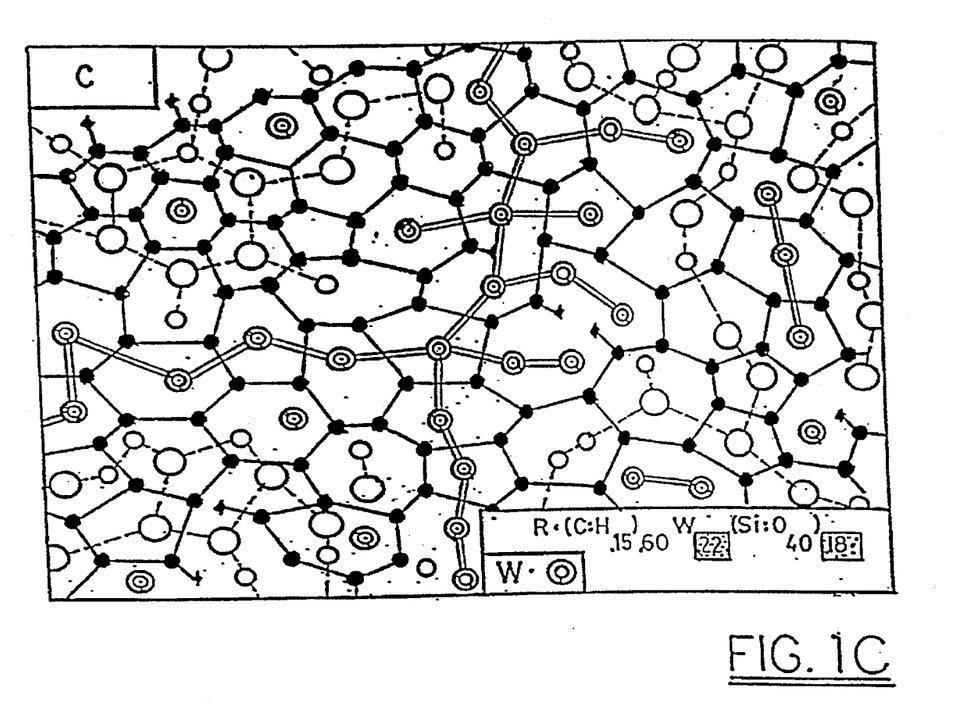

The atomic structure of the class of diamond-like nanocomposite (DLN) solid state materials of the present invention is shown in FIG. 1(A). The DLNs may have one or more additional separate disordered networks of dopants, as shown in FIG. 1(B) and 1(C). The dopants may be any one, or a combination of transition metals and non-metals of the Groups 1–7b and 8 of the periodic table, with all three types of networks (C—H; Si—O and the dopant network, Me—Me) bonded to each other predominantly by weak chemical bonds. The network elements other than the C—H network may also be referred to as alloying elements. Silicon and oxygen may also be used in dopant networks with other dopant elements or dopant compounds.

When the optional, additional dopant-containing network is present, the dopant network is interspersed along with the previously mentioned two interpenetrating networks. In this instance three or more interpenetrating networks will be present in the DLN to form a so-called Me-DLN (metal-diamond-like nanocomposite) network. It is understood that non-metal dopant networks, may also be incorporated as the optionally present dopant networks interpenetrating the C—H and Si—O networks. It is further understood that when dielectric coatings are desired, non-conductive dopants may be incorporated as the third network. This may include conductive elements which are reacted to yield a non-conductive compound. When tunably conductive coatings are desired, conductive elements and compounds may be used as the dopants in the dopant network.

The three networks (C—H matrix, Si—O matrix and a dopant matrix) are bonded to one another mainly by weak chemical attractive forces. Formation of crystalline carbides can be prevented even at metal concentrations as high as 50% (verified using Auger electron spectroscopy, electron spectroscopy for chemical analysis (ESCA), extended x-ray absorption fine structure spectroscopy (EXAFS) and Fourier transform infrared spectroscopy (FTIR)). In addition, in certain DLN films, evidence of Si—C or Me—C bonding up to about 20% has been found. Again, the properties of these materials can be varied over wide ranges depending on the dopant and the concentration selected, as well as the deposition technique and parameters. As already mentioned, the structure of these composites can be tailored at the molecular level. Therefore, unique electrical, optical, and other desirable solid state properties with desired mechanical strength, hardness and chemical resistance can be imparted on the DLN coatings which can be used to coat both metal and non-metal containing substrates.

Preferred dopant elements to be used in the Me-DLN network, and which are particularly effective for use as dopants in a tunable dielectric Me-DLN coating are B, Li, Na, Si, Ge, Te, O, Mo, W, Ta, Nb, Pd, Ir, Pt, V, Fe, Co, Mg, Mn, Ni, Ti, Zr, Cr, Re, Hf, Cu, Al, N, Ag and Au; with W, Cr, Zr, Ti and Hf being most preferred. Preferred compounds which may be used as dopants include TiN, BN, AlN, ZrN and CrN; with TiN and ZrN being most preferred.

The carbon content in the diamond-like nanocomposite material is greater than about 40 atomic % of the DLN, preferably about 40 to about 98 atomic %, more preferably about 50 to about 98 atomic %. Although the DLN may theoretically be prepared without any hydrogen, the hydrogen content is preferably at least about 1 atomic % and up to about 40 atomic % of the carbon concentration. The sum of the silicon, oxygen and dopant elements and dopant containing compounds is greater than about 2 atomic % of the DLN. In one preferred embodiment, the ratio of carbon to silicon atoms is from about 2:1 to about 8:1, hydrogen to carbon atoms is about 0.01:1 to about 0.4:1, silicon to oxygen atoms is about 0.5:1 to about 3:1, and dopant to carbon atoms is about 0:1 to about 1.5:1. Therefore, in the DLN network, for every 1 part carbon, there is from about 0.01 to about 0.4 parts hydrogen, from about 0.125 to about 0.5 parts silicon, and from about 0.0375 to about 1.0 parts oxygen. In such a scheme, if a third dopant network were present, for every 1 part carbon, there would be from about 0.01 to about 1.5 parts dopants depending upon the desired characteristics to be imparted to the Me-DLN network.

The electrical properties of the DLN structures of this class of materials can be continuously varied over at least about 20 orders of magnitude from a conductive material, at about $10^{-5}$ Ohm·cm, to a highly dielectric state, at about $10^{-15}$ Ohm·cm, while preserving the properties of the DLN state. A transition to a superconducting state, with the absence of electrical resistivity, is observed at low temperatures for certain three-network nanocomposite networks. As a result, either or both of the conductive and dielectric layers in the capacitors of the present invention may be made from the DLN coatings disclosed herein.

As already discussed, the structure of these composites can be tailored or "tuned" at the molecular level to combine unique electrical, optical, and other desirable solid state properties with "tunable" mechanical strength, hardness and chemical resistance properties. It is important that the coatings of the present invention be hard, resilient and able to withstand wear and friction normally associated with use as an electrical component.

It is contemplated that single layers or multiple layers of the identical or differing (based on chemical content) doped and undoped DLNs may be used to give the desired resistivity and other physical properties. Such multilayered coatings would be useful for making capacitors capable of very high capacitance. Such "ultracapacitors" may have a thickness of about 10 nm and be comprised of 100 or more doped and undoped layers, depending upon the particular electronic application. Such flexibility of the DLNs could obviate the need for metallic layers, as metal-doped DLN layers could be made to achieve the necessary conductivity. Therefore, when a completely dielectric capacitor layer is desired, the two-network DLN may be used. To deposit layers of varying degrees of conductivity three-network (metal-containing) DLNs may be used. A completely dielectric coating would inhibit surface "breakdown" and offer superior substrate protection. The breakdown strengths of the DLNs of the present invention range from about $10^6$ to about $10^9$ V/cm depending upon the chemical substituents of the DLN coating.

To improve adherence, known DLC coatings often place an intermediate layer, or interlayer, between the substrate and the DLC coating. However, the presence of the interlayer limits the useful thickness of the DLC coatings. Further, if the DLC coatings are too thick, delamination occurs. Surprisingly, with the DLN coatings of the present invention, adherence is so good that an interlayer is not required. The presence of the glass-like silicon network, stabilized by oxygen, serves to prevent the growth of graphitic carbon at high temperatures and, to prevent metal cluster formation in metal-containing three-network nanocomposites, as well as reducing the internal stress in the nanocomposite structure, thereby enhancing the DLN adhesion directly to substrates. This appears to lead to superior adherence of the DLNs of the present invention to the selected substrate material.

It is however, understood, that interlayers may also be used with the DLNs of the present invention, if desired. Use of such interlayers may still further improve the excellent adherence of the DLNs. Such a DLN/interlayer combination may be desired when the capacitors of the present invention are incorporated into electronics for medical devices destined for long-term implantation in human bodies, such as defibrillator capacitors.

Since the DLN films of the present invention may be deposited to predictably hold charges of varying amounts (or no charges at all), the present invention also contemplates a method of increasing the charge holding capacity of a surface. Layers of charge-holding DLNs can be provided to other apparatuses, for example printing rolls and other components which must hold and/or release surface charges during operation.

Further, the present invention further contemplates layering of dielectric DLN layers in a capacitor interspersed with conductive layers of doped DLN. In this embodiment the entire capacitor comprises DLN layers. Some of the layers are conductive to predictably varying degrees. Some of the layers are undoped, doped with non-conductive dopants, or doped to a small degree with conductive dopants and act as dielectric layers.

To be useful as dielectric coatings, the coatings must have predictable non-conductive or minimal conductive properties which must not vary over time; or in response to extreme conditions, such as heat. Inhibiting graphitization of the carbon is critical for preserving dielectric properties, as graphitized carbon is more conductive than the network-protected DLC. Therefore, the ability of the DLN coatings to be more thermally stable than the DLCs gives the tunable dielectric DLN coatings a significant advantage over DLC coatings, in terms of inhibiting conductivity. To inhibit such graphitization, the DLN coatings of the present invention have temperature stability far exceeding that of traditional diamond-like (DLC) materials. Crystalline diamond is stable to approximately 1100° C., upon which graphitization occurs. Quartz has long term thermal stability to 1470° C., and short term thermal stability up to 1700° C. Traditional, non-alloyed diamond-like films are stable only to about 250°–600° C. before graphitization occurs. Known alloyed DLC films are much less thermally stable. By contrast, the DLN structures used to provide the tunable dielectric coatings of the present invention have long term stability to over 1000° C. and short term stability to 2000° C.; i.e. thermal stability of the DLN may even exceed that of crystalline diamond while preserving the amorphous, diamond-like state.

In the range of from about 600° C. to about 1000° C., the chemical bonds of the carbon matrix of DLN materials partly change from $sp^3$ to $sp^2$. However, the general structure of the nanocomposite and their "diamond-like" properties are preserved. By contrast, under similar conditions, the usual "diamond-like" carbon (DLC) is graphitized and loses its diamond-like properties. Further, in the range of from 400° C. to 500° C. (preferably 430° C.), a reverse annealing is observed, whereby the ratio of $sp^3$ to $sp^2$ is increased.

The density of the C—H and Si—O two-network DLN varies from about 1.8 to about 2.1 $g/cm^3$. The rest of the space is taken up by a random network of nanopores with diameters varying from about 0.28 to about 0.35 nm. The nanopore network does not form clusters or micropores. The properties of the two-network DLN may then be tailored by adding dopant. The dopants fill the nanopore network in a random fashion, eventually resulting, at a certain dopant concentration, in an additional network without clusters or microcrystalline grains, even at concentrations as high as 50 atomic %. At concentrations below about 10 atomic %, the dopants are distributed as 10 separate atoms in the nanopores of the diamond-like matrix. The average distance between dopant atoms in this quasi-random structure can be controlled by the concentration of the dopant. When the relative concentration of the dopant element or compound reaches about 20–25 atomic %, the dopants form the third (Me—Me) network in the DLN structure as shown in FIG. 1(C). Another advantage of the DLNs of the present invention is their relative hardness and durability. The DLNs, especially the metal doped DLNs combine high microhardness with high elasticity. The microhardness values of the DLNs of the present invention can range from about 6 to about 30 GPa.

The DLNs may be synthesized via co-deposition by clusterless beams of ions, atoms or radicals of the relevant elements, where the mean free path of each particle species exceeds the distance between its source and the growing particle film surface, and each beam contains particles of well-defined energy. Carbon-containing particle beams can be produced by plasma discharge in a plasmatron and extracted as charged particles by a high-voltage field in a vacuum chamber and directed onto the substrate.

Figure 2:
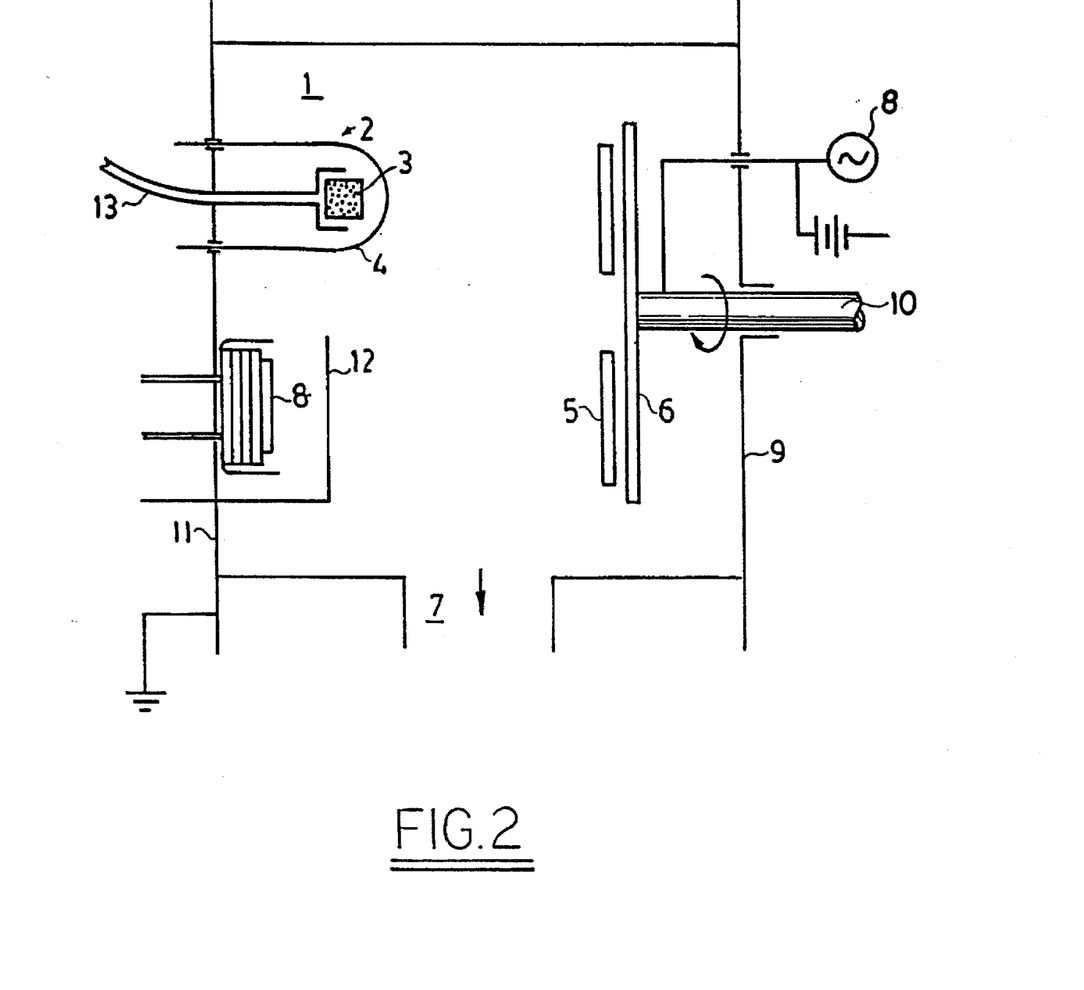
FIG. 2 is a cross section view of the deposition chamber for the deposition of the DLNs.

FIG. 2 shows one preferred embodiment of the coating chamber used for the DLN coating deposition process. For the application of very thin layers (less than about 1 micrometer), it is especially important to eliminate contaminants including dust particles from the substrate and deposition chamber surface, and the chamber environment. A vacuum deposition chamber 1 is provided to coat a conductive substrate sample. A precursor inlet system 13, comprises a metal tube and a porous ceramic material 3 through which a liquid precursor, preferably a polysiloxane, is injected. The precursor inlet system 13 is shown incorporated into the chamber through the chamber base plate 11. The thermocathode 2 comprises a resistively heated thoriated tungsten filament 4. Conductive substrates 5 to be coated with the dielectric DLN film are attached to the substrate holder 6. The power supply 8 is used for biasing the substrates (DC or RF). In practice the system is "pumped down" using normal vacuum pump down procedures. A gate valve (not shown) located on port 7 is closed and the system is backfilled with dry air, nitrogen or argon until the chamber reaches atmospheric pressure. The door of the chamber, 9, is then opened and substrates to be coated 5 are attached to the substrate holder 6 using any one or combination of many possible methods (spring clip, screw, clamp, etc.). Special fixtures may be required for substrates of special shapes. The substrate holder is designed in a way that it will also hold a cylinder sample (not shown), which, in operation, rotates both about the axis of the central drive shaft 10, and its own axis which is perpendicular to 10. In this way, the axis of the cylinder would be perpendicular to the axis of 10.

When the conductive substrates are loaded, the door of the chamber is closed, the chamber evacuated and the gate valve opened to bring system pressure down to at least $10^{-5}$ to $10^{-6}$ Torr, which is the desired range of system base pressure. When the above base pressure is achieved, argon gas is introduced into the chamber via a needle valve or mass flow controller, until the chamber pressure reaches approximately $5 \times 10^{-5}$ to $1 \times 10^{-3}$ Torr, preferably about $1-3 \times 10^{-4}$ Torr. At this point the filament current, the filament bias, and the electromagnet power supply are switched on. The filament current is the current that passes through the thermocathode (also called the filament or the cathode). The filament bias is the constant floating voltage applied to the filament (approximately −150 V in relation to ground). Plasma current is measured as the current between the filament and the base plate or ground. This voltage provides the field that moves electrons emitted by the filament to the base plate 11. The electromagnet power supply provides current to the electromagnet, which creates a magnetic field that results in the electron path becoming a spiral, increasing the electron path length and improving the probability of collisions between the electrons and the vapor molecules created due to precursor evaporation. The substrate bias power supply is concurrently switched on.

Switching on these power supplies results in creation of an argon plasma, which is used to clean the substrates prior to deposition. After the required duration of cleaning, the precursor supply is opened. Precursor flow is controlled via a needle valve and occurs due to the difference in pressure between the chamber and the outside atmosphere. When precursor flow and vaporization in the chamber has stabilized, the argon gas flow is turned off. The ionized precursor vapors form a stable plasma, ions from which are accelerated towards the substrate holder due to the substrate bias. Thus, deposition of DLN film occurs.

Co-deposition of a dopant material is carried out as follows. Argon flow to the magnetron is commenced and the magnetron 8 is switched on after the base pressure has been reached. A shutter 12 is used to prevent deposition while the conductive substrate is cleaned via sputtering. When cleaning has been accomplished, the shutter 12 is opened and sputtering is carried out at the desired power level. This may occur prior to commencement of DLN film deposition, during DLN film deposition, after DLN film deposition, or intermittently during DLN film deposition, depending on what kind of film structure and composition are desired. Using DC or RF sputtering, materials of all kinds (metals, ceramics, alloys, etc.) can be used for codeposition.

The growth conditions for nanocomposite films are as follows, with reference to FIG. 2. The pressure in the deposition chamber 1 should not exceed $10^{-3}$ torr, with the pressure in the active zone of the plasma generation 2, in the range from about $1.0 \times 10^{-3}$ to about $5.0 \times 10^{-2}$ torr. The temperature of the substrate should not exceed about 200° C. with the temperature of the cathode filaments being in the range from about 2100° to about 2950° C. The current in the cathode filament is from about 70 to about 130 angstroms, with the voltage across the filament being from about 20 to about 30 V. The voltage with respect to the ground is from about 70 to about 130 V with the plasma current being from about 0.5 to about 20.0 angstroms. The voltage of the substrate holder is from about 0.1 to about 5.0 Kv, with alli the carbon-containing and Si-containing species having kinetic energy in the range of from about 100 to about 1200 eV and from about 25 to about 300 eV respectively. The metal beams consist of free atoms or monaromic ions. The kinetic energy of the metal atoms/ions does not exceed from about 25 eV. With a precursor flow rate from about 0.5 to about 5.0 cc/hour, the growth rate of the DLN is from about 0.1 to about 2.0 micrometers/hour.

The preferred range of operation for most applications is a pressure of about $1-3 \times 10^{-4}$ Torr, a plasma current of about 1 amp., a filament current of from about 60 to about 75 amp., a substrate voltage of from about 600 to about 1000 V DC, or forward power of about 100 W in RF mode. The preferred frequency for RF mode is from about 90 to about 300 kHz. The preferred magnetron power depends on the type of material, composition and structure desired for the DLN coating.

Figure 3:
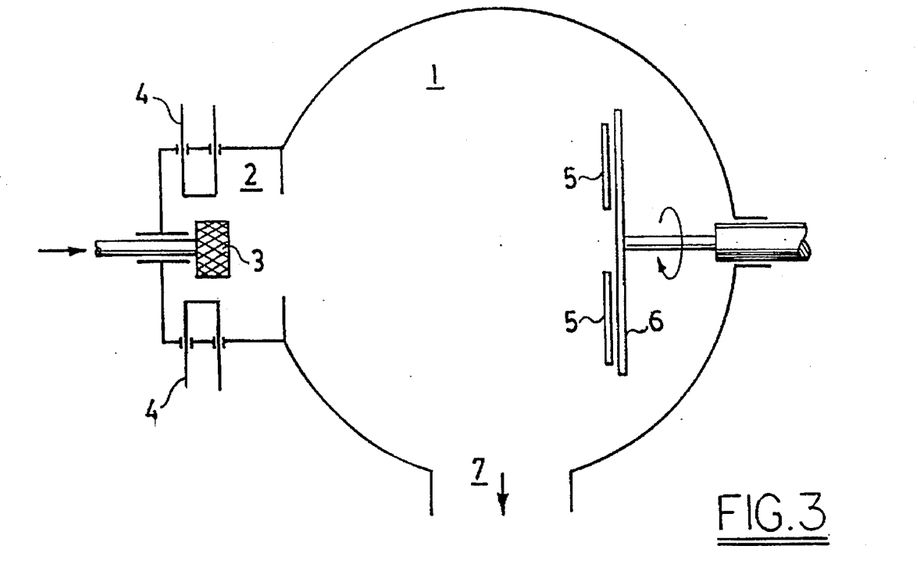
FIG. 3 is a cross section view of the deposition chamber for the deposition of DLNs using a reflecting electrode.

In a further preferred embodiment, a preferred method of deposition uses a plasma discharge in a triode plasmatron, as shown schematically in FIG. 3, with the plasma energy density above about 5 Kwh/gram-atom of carbon. The charged particles are extracted by a high voltage field in the vacuum chamber and directed onto the substrate 5. It is preferable that the potential of the substrate holder is from about −0.3 to about +5.0 Kv, and most preferably 1.0±−0.2 Kv, and varying with a frequency in the range of from about 0 to about 25 Mhz for DC and from about 90 to about 300 kHz for RF. The ratio of the electron emission to the carbon precursor flow in the plasmatron is from about 0.5 to about 1.5 electrons per particle.

Organosilicon compounds, such as siloxane, are preferred precursors for C, H, Si and O. One preferred organosilicon compound is polyphenylmethylsiloxane, containing 1 to 10 Si atoms. The high boiling point siloxanes may be introduced directly into the active plasma region through a porous ceramic, metallic or metallo-ceramic head (3 in FIG. 3 and FIG. 4) which is heated via radiation from thermocathodes 4. The photon and electron emission of the thermocathodes affect the evaporation, fragmentation and ionization of the precursor molecules on the surface of the head 3, which thereby functions as an ion source for the plasma generator. An alternative method for injection of the siloxane precursors is to use direct injection from a diffusion pump.

The formation of dopant-containing beams may be realized by any one of, or combination of, the following methods: 1) thermal evaporation; 2) ion-sputtering; 3) ion beams. The dopant-containing beams are directed onto the growing film surface through the vacuum chamber to exclude interparticle collisions in the deposition chamber itself. Substrates are placed in an adjacent chamber on a rotating substrate holder, (for example a drum) which ensures double rotary motion, said adjacent chamber being connected to the plasma generation chamber by an opening for the emission of the atomic or ionic beams, as shown schematically in FIG. 2. Alternatively, the plasma generation may be carried out within the chamber containing the substrates. A DC or a radio frequency potential is generally applied to the substrates during the deposition process. No external substrate heating is required. The substrate holder may be designed specifically to hold parts of different shapes, as would be apparent to one skilled in the field. Useful variations of the above described methods for deposition of DLN films include, the use of sputtered silicon and oxygen gas as precursors for the Si and $O_2$, the use of sputtered carbon and hydrogen or hydrocarbon gas used as carbon and hydrogen precursors, or any combination thereof.

Figure 4:
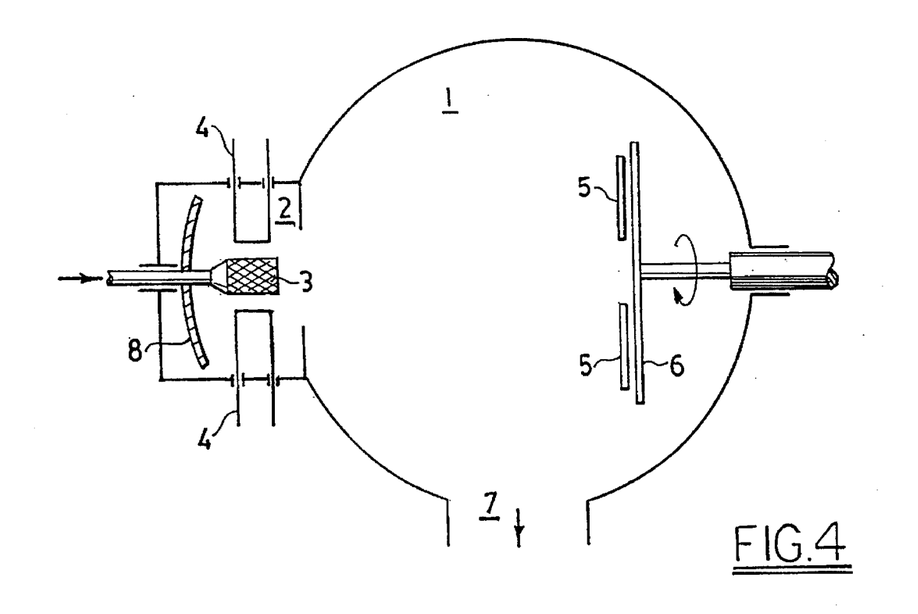
FIG. 4 is a cross section view of a preferred deposition chamber using a plasma source integrally located within the chamber.

For deposition on non-conducting substrates, a method whereby a flow of neutral radicals is reflected from a high voltage target and directed to the substrate as shown schematically in FIG. 4. The process employs depositions similarly to those shown in FIG. 3, except that a reflecting electrode is used to generate a neutral beam. This process eliminates, surface damage of the substrate resulting from charged and/or fast particles impinging on the substrate during growth.

The above-described flexible coatings of the present invention may be deposited on the selected substrate in thicknesses ranging from a few nanometers to a few microns, preferably from about 20 nm to about 12 micrometers, depending only on the desired application of the coated substrate. For the thin capacitor uses of the present invention, the preferred DLN layer thickness is in the range of from about 0.01 to about 100 micrometers, more preferably from about 0.05 to about 5 micrometers, with a coating of from about 0.1 to about 2 micrometers being most preferred. The deposition may therefore be tailored to meet the properties required for each particular application.

The random interpenetrating of the two- or three-network DLNs guarantees uniform strength of the structures in all directions. The structures are free of micropores even at thicknesses of 80 Angstroms (8 nm). The DLNs are therefore extremely stable and possess unique combinations of chemical, mechanical, electronic, and superconducting properties.

Many other modifications and variations of the present invention are possible to the skilled practitioner in the field in light of the teachings herein. It is therefore understood that, within the scope of the claims, the present invention can be practiced other than as herein specifically described.

What is claimed:

1. A method of making a capacitor comprising:
providing multiple conductive layers; and
providing a dielectric layer between adjacent conductive layers, said dielectric layer made from a diamond-like solid state material having interpenetrating networks comprising a diamond-like carbon network stabilized by hydrogen, a glass-like silicon network stabilized by oxygen, and optionally at least one network of non-conductive dopant elements or non-conductive dopant compounds containing elements from Groups 1 to 7b and 8 of the periodic table.

2. The method according to claim 1, wherein the carbon, hydrogen, silicon and oxygen are obtained from the decomposition of an organosiloxane having from about 1 to about 10 silicon atoms.

3. The method according to claim 2, wherein the organosiloxane is polyphenylmethylsiloxane.

4. The method according to claim 1, wherein the carbon content of the diamond-like material is from about 40 wt. % to about 98 wt. %.

5. The method according to claim 1, wherein the carbon content of the diamond-like material is from about 50 wt. % to about 98 wt. %.

6. The method according to claim 1, wherein the carbon to silicon weight ratio of the diamond-like material is from about 2:1 to about 8:1.

7. The method according to claim 1, wherein the silicon to oxygen weight ratio of the diamond-like material is from about 0.5:1 to about 3:1.

8. The method according to claim 1, wherein the coating is deposited on a metal substrate.

9. The method according to claim 1, wherein the coating is deposited on a non-metal substrate.

10. The method according to claim 1, wherein the dopant elements are selected from the group consisting of B, Li, Na, Si, Ge, Te, O, Mo, W, Ta, Nb, Pd, Ir, Pt, V, Fe, Co, Mg, Mn, Ni, Ti, Zr, Cr, Re, Hf, Cu, Al, N, Ag, and Au.

11. The method according to claim 1, wherein the carbon content is greater than about 40 atomic % of the coating, the hydrogen content is from about 1 atomic % up to about 40 atomic % of the carbon, and the sum of the silicon, oxygen and dopants together is greater than about 2 atomic % of the coating.

12. The method according to claim 1, wherein the dielectric material is deposited to a thickness of from about 0.05 to about 5 micrometers.

13. The method according to claim 1 wherein the dielectric material is deposited to a thickness of from about 0.1 to about 2.0 micrometers.

14. The method according to claim 1, wherein the conductive layers are made from a material comprising a diamond-like solid state material having interpenetrating networks comprising a diamond-like carbon network stabilized by hydrogen, a glass-like silicon network stabilized by oxygen, and at least one network of non-conductive dopant elements or non-conductive dopant compounds containing elements from Groups 1 to 7b and 8 of the periodic table.

15. A capacitor comprising layers of electrically conductive materials and dielectric materials, wherein a layer of dielectric material is placed between adjacent layers of electrically conductive materials, said dielectric material made from a diamond-like solid state material formed from interpenetrating networks comprising a diamond-like carbon network stabilized by hydrogen, a glass-like silicon network stabilized by oxygen and, optionally, at least one network of dopant elements or dopant compounds having elements from Groups 1–7b and 8 of the periodic table.

16. The capacitor according to claim 15 wherein the carbon content is greater than about 0 atomic % of the coating, the hydrogen content is from about 1 atomic % up to about 40 atomic % of the carbon, and the sum of the silicon, oxygen and dopants together is greater than about 2 atomic % of the coating.

17. The capacitor according to claim 15, wherein the carbon, hydrogen, silicon and oxygen are obtained from the decomposition of an organosiloxane having from about 1 to about 10 silicon atoms.

18. The capacitor according to claim 17, wherein the organosiloxane is polyphenylmethylsiloxane.

19. The capacitor according to claim 15, wherein the carbon content of the diamond-like material is from about 40 wt. % to about 98 wt. %.

20. The capacitor according to claim 15, wherein the carbon to silicon weight ratio of the diamond-like material is from about 2:1 to about 8:1.

21. The capacitor according to claim 15, wherein the silicon to oxygen weight ratio of the diamond-like material is from about 0.5:1 to about 3:1.

22. The capacitor according to claim 15, wherein the dopant elements are selected from the group consisting of B, Li, Na, Si, Ge, Te, O, Mo, W, Ta, Nb, Pd, Ir, Pt, V, Fe, Co, Mg, Mn, Ni, Ti, Zr, Cr, Re, Hf, Cu, Al, N, Ag and Au.

23. The capacitor according to claim 15, wherein said layer is deposited in a thickness of from about 0.05 to about 5 micrometers.

24. The capacitor according to claim 15 wherein said layer is deposited in a thickness of from about 0.1 to about 2.0 micrometers.

25. The capacitor according to claim 15, wherein the conductive layers are made from a material comprising a diamond-like material having interpenetrating networks comprising a diamond-like carbon network stabilized by hydrogen, a glass-like silicon network stabilized by oxygen, and at least one network of non-conductive dopant elements or non-conductive dopant compounds containing elements from Groups 1 to 7b and 8 of the periodic table.

26. A method of controlling the charge-holding capacity of a substrate surface comprising:
    providing a substrate surface; and
    coating the substrate surface with at least one dielectric layer, said dielectric layer made from a diamond-like solid state material having interpenetrating networks comprising a diamond-like carbon network stabilized by hydrogen, a glass-like silicon network stabilized by oxygen, and optionally at least one network of dopant elements or dopant compounds containing elements from Groups 1 to 7b and 8 of the periodic table.

27. A component capable of holding a charge on a component surface, said component comprising:
    at least one layer of dielectric material made from a diamond-like solid-state material formed from interpenetrating networks comprising a diamond-like carbon network stabilized by hydrogen, a glass-like silicon network stabilized by oxygen and, optionally, at least one network of dopant elements or dopant compounds having elements from Groups 1–7b and 8 of the periodic table;
    and optionally, at least one conductive layer.

* * * * *